(12) United States Patent
Lazarus et al.

(10) Patent No.: US 10,638,110 B2
(45) Date of Patent: Apr. 28, 2020

(54) DUAL MODE USER INTERFACE SYSTEM AND METHOD FOR 3D VIDEO

(71) Applicant: Google Technology Holdings LLC, Mountain View, CA (US)

(72) Inventors: David B. Lazarus, Elkins Park, PA (US); Yaxi Zhang, Wayne, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 15/985,037

(22) Filed: May 21, 2018

(65) Prior Publication Data

US 2018/0270469 A1    Sep. 20, 2018

Related U.S. Application Data

(63) Continuation of application No. 15/056,336, filed on Feb. 29, 2016, now Pat. No. 9,979,947, which is a
(Continued)

(51) Int. Cl.
*H04N 7/12*        (2006.01)
*H04N 13/139*    (2018.01)
(Continued)

(52) U.S. Cl.
CPC ......... *H04N 13/139* (2018.05); *H04N 13/156* (2018.05); *H04N 13/161* (2018.05);
(Continued)

(58) Field of Classification Search
CPC .. H04N 13/139; H04N 13/156; H04N 13/161; H04N 13/172; H04N 13/183; H04N 13/30; H04N 13/356; H04N 2213/007
(Continued)

(56) References Cited

U.S. PATENT DOCUMENTS

| 5,016,113 A | 5/1991 | Yamashita et al. |
| 7,265,902 B2 | 9/2007 | Lee et al. |

(Continued)

FOREIGN PATENT DOCUMENTS

EP        1427222        6/2004

OTHER PUBLICATIONS

3D Fusion, "Dual Mode", pp. 1, available at: http://www.3dfusion.com/dual-mode.html.
(Continued)

*Primary Examiner* — Gim S Philippe
(74) *Attorney, Agent, or Firm* — Byrne Poh LLP

(57) ABSTRACT

A system is provided for use with a video input signal and a video unit. The video input signal can be one of a two dimensional video signal and a three dimensional video signal. The video unit can display a three dimensional video and a two dimensional video. The system includes a receiver portion, a processing portion, a switching portion and an output portion. The receiver portion can receive the video input signal. The processing portion can output a first signal in a first mode of operation and can output a second signal in a second mode of operation, wherein the first signal is based on the video input signal and the second signal is based on the video input signal. The switching portion can switch the processing portion from the first mode of operation to the second mode of operation. The output portion can provide an output signal to the video unit, wherein the output signal is based on the first signal when the processing portion operates in the first mode of operation and wherein the output signal is based on the second signal when the processing portion operates in the second mode of operation. The first signal includes a two dimensional video signal, whereas the second signal includes a three dimensional video signal.

18 Claims, 4 Drawing Sheets

Related U.S. Application Data continuation of application No. 13/181,536, filed on Jul. 13, 2011, now Pat. No. 9,294,752.

(51) Int. Cl.
*H04N 13/156* (2018.01)
*H04N 13/161* (2018.01)
*H04N 13/172* (2018.01)
*H04N 13/183* (2018.01)
*H04N 13/356* (2018.01)
*H04N 13/30* (2018.01)

(52) U.S. Cl.
CPC ......... *H04N 13/172* (2018.05); *H04N 13/183* (2018.05); *H04N 13/30* (2018.05); *H04N 13/356* (2018.05); *H04N 2213/007* (2013.01)

(58) Field of Classification Search
USPC ................................ 348/43, 51, 46; 345/419
See application file for complete search history.

(56) References Cited

U.S. PATENT DOCUMENTS

| | | | |
|---|---|---|---|
| 7,295,264 | B2 | 11/2007 | Kim |
| 7,675,514 | B2 | 3/2010 | Ni et al. |
| 8,937,648 | B2 | 1/2015 | Yang |
| 2007/0183650 | A1 | 8/2007 | Lipton et al. |
| 2009/0315979 | A1 | 12/2009 | Jung et al. |
| 2010/0225645 | A1* | 9/2010 | Suh ................ H04N 21/234327 345/419 |
| 2011/0063422 | A1 | 3/2011 | Yoo |
| 2011/0074934 | A1* | 3/2011 | Ko ........................ H04N 13/10 348/51 |
| 2011/0122127 | A1 | 5/2011 | Ko |
| 2011/0242292 | A1 | 10/2011 | Kato |
| 2011/0273534 | A1* | 11/2011 | Luthra ................. H04N 13/183 348/43 |
| 2011/0285827 | A1 | 11/2011 | Takigawa et al. |
| 2012/0105583 | A1* | 5/2012 | Suh ...................... H04N 19/597 348/43 |
| 2012/0120194 | A1 | 5/2012 | Newton et al. |
| 2013/0141536 | A1* | 6/2013 | Choe .................. H04N 5/44591 348/43 |
| 2013/0147912 | A1 | 6/2013 | Kim et al. |
| 2013/0155206 | A1* | 6/2013 | Lazarski .............. H04N 17/045 348/51 |

OTHER PUBLICATIONS

International Preliminary Report on Patentability dated Jan. 14, 2014 in International Patent Application No. PCT/US2012/044541.
International Search Report and Written Opinion of the International Searching Authority dated Aug. 17, 2012 in International Patent Application No. PCTUS2012/044541.
Knoder, Jonathan., "LG 55LW6500", available at: http://3d-tv-review.toptenreviews.com/lg-551w6500-review.html, last accessed Feb. 28, 2012.
Notice of Allowance dated Jan. 24, 2018 in U.S. Appl. No. 15/056,336.
Notice of Allowance dated Nov. 12, 2015 in U.S. Appl. No. 13/181,536.
Office Action dated Apr. 30, 2014 in U.S. Appl. No. 13/181,536.
Office Action dated Jun. 16, 2015 in U.S. Appl. No. 13/181,536.
Office Action dated Oct. 6, 2017 in U.S. Appl. No. 15/056,336.
Office Action dated Nov. 25, 2014 in U.S. Appl. No. 13/181,536.

* cited by examiner

DUAL MODE USER INTERFACE SYSTEM AND METHOD FOR 3D VIDEO

CROSS-REFERENCE TO RELATED APPLICATIONS

This application is a continuation of U.S. patent application Ser. No. 15/056,336, filed Feb. 29, 2016, which is a continuation of U.S. patent application Ser. No. 13/181,536, filed Jul. 13, 2011, each of which is hereby incorporated by reference herein in its entirety.

BACKGROUND

A method used for creating a three dimensional (3D), or stereoscopic, image has been used for some time now, primarily in movie theaters. It generally involves creating two images for each frame, one indented for the left eye and one intended for the right. In movie theaters, these images are displayed simultaneously. The viewer wears specialized glasses that filter the appropriate images for each eye. More specifically, the left lens of the glasses filters out the right image so the left eye only sees the left image. Similarly, the right lens of the glasses filters out the left image so the right eye only sees the right image. When the images are combined in the brain the illusion of depth is created and the viewer sees a "3D" image.

Modern televisions with 3D capability use a more complicated active shutter method. Just as with movie theaters, two images are created for each frame, one for the left eye and one for the right eye. The viewer also must wear specialized glasses. However, instead of using filters to distribute the images to the appropriate eye, each lens closes, or shutters. The television also does not display the images simultaneously. In operation, the television displays the left image and the right lens shutters allowing only the left eye to see the left image. Then, the television displays the right image and the left lens shutters allowing only the right eye to see the right image. This process repeats very rapidly and the viewer does not notice the shuttering. This is how the illusion of depth is created. While the active shutter system is the most widely used 3D technology for the television, passive/polarized lens systems are additionally on the market. Further, there are systems that do not need glasses, although they have significant draw backs when in the 3D mode.

The active shutter method creates a synchronizing issue, when there is a 3D format change. For instance, when converting from a side-by-side 3D format to a top-to-bottom 3D format, the placement of the two perspective changes. The television may be instructed of the switch, but it is not provided with any information about exactly when the change will occur. Accordingly, the source of the 3D content changes format and the television changes how it reads the content, but there is no synchronization for the change. In other words, the television may change format at a different time from the format change of the 3D content from the source, resulting in a poor image.

The operation of a conventional television viewing system will now be described with reference to FIG. 1.

FIG. 1 illustrates a conventional television viewing system 100 operable to display content from a television service provider (not shown).

Conventional television viewing system 100 includes a set-top box 102, a video unit 104 and a remote control unit 106.

Set-top box 102 is arranged to receive an input signal 108 from a television service provider (not shown), to receive a remote control signal 112 and to output an output signal 110. Video unit 104 is arranged to receive output signal 110. Remote control unit 106 is arranged to output remote control signal 112.

Communication between any of the elements of conventional television viewing system 100 may be accomplished by way of any known communication media. Signals typically embody computer-readable instructions, data structures, program modules, or other data in a modulated data signal such as a carrier wave or other transport mechanism and include any information-delivery media. Non-limiting examples of communications media between any of the elements of conventional television viewing system 100 include wired media, such as wired networks and direct-wired connections, and wireless media such as acoustic, radio-frequency, infrared, etc. The term "tangible computer-readable media" as used herein includes both storage and communications media.

Further, in some embodiments at least one of the elements of conventional television viewing system 100 may be implemented as tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (hardwired and/or wireless, or a combination of hardwired or wireless) to a computer, the computer properly views the connection as a tangible computer-readable medium. Thus, any such connection is properly termed a tangible computer-readable medium. Combinations of the above should also be included within the scope of tangible computer-readable media.

Remote control unit 106 is operable to send commands from the user to set-top box 102. Non-limiting examples of commands include those for changing the channel, displaying content information and displaying the channel guide. Set-top box 102 is operable to process television content from input signal 108 into an appropriate signal for video unit 104. Video unit 104 is operable to display video and to play audio content processed by set-top box 102. Non-limiting examples of video unit 104 include a television, hand-held communication device and a computer.

In operation, the user would utilize remote control unit 106 to send commands to set-top box 102. For the purposes of explanation, assume that a command or series of commands are used to select a channel. Remote control unit 106 would send the command or commands through remote control signal 112. Remote control unit 106 may be any known remote control unit, non-limiting examples of which include a computer, a cellular phone, and a dedicated remote.

Once set-top box 102 has received remote control signal 112, set-top box 102 will then process input signal 108 and create output signal 110. Video unit 104 then presents the audio and video included in output signal 110 to the user.

A more detailed description of the operation of set-top box 102 will now be described with reference to FIG. 2.

FIG. 2 illustrates an example block diagram of set-top box 102 of FIG. 1.

As illustrated in FIG. 2, set-top box 102 includes a receiver portion 202, a decoder 204, a compositor 206, a graphics device 208 and an output portion 210.

Receiver portion 202 is arranged to receive input signal 108 and to output input data 212. Decoder 204 is arranged to receive input data 212 and to output decoded data 214. Graphics device 208 is arranged to output display graphics 216. Compositor 206 is arranged to receive decoded data 214, to receive display graphics 216 and to output composite data 218. Output portion 210 is arranged to receive composite data 218 and to output output signal 110.

Receiver portion 202 is operable to perform many functions. At a minimum, receiver portion 202 performs the function of a tuner. A tuner retrieves the appropriate channel data from input signal 108. In another example, receiver portion 202 may also perform the function of a decrypter. A decrypter is needed if input signal 108 is encrypted. Decoder 204 is operable to decompress compressed data. A non-limiting example of a compressed data type is MPEG4.

Graphics device 208 is operable to generate the display graphics and may include multiple portions. These portions may include memory where graphics are stored and a graphics processor. Non-limiting examples of display graphics include a channel guide and content information.

Compositor 206 combines the video with display graphics. A non-limiting scenario of combining video with display graphics includes when the channel guide is called by the user. In this example, compositor 206 may shrink the channel video and place the channel video in the upper right corner of the channel guide.

Output portion 210 is operable to interface the content to be displayed with video unit 104. A non-limiting example of a television interface is HDMI.

In operation, input signal 108 is received by receiver portion 202. Input signal 108 includes data for a multitude of channels provided by the television service provider. Data for each channel includes audio data, video data and meta-data.

Meta-data is used by devices to determine the format of the channel video data. There are a multitude of possible formats for channel video. For 2D video, the format can be one of many resolutions. For 3D video, the 2D format parameters are augmented by parameters to describe how to derive both (or more) perspectives. One example 3D format is the left eye image on the left, the right eye image on the right and both images at the same resolution.

Returning to FIG. 2, receiver portion 202 may perform multiple functions, a non-limiting example of which includes tuning. In this example, assume receiver portion 202 only acts as a tuner. In this case, receiver portion 202 filters out all data except for the data for the channel selected by the user. This is input data 212 and includes, but is not limited to, audio data, video data, and meta-data. Input data 212 is then transmitted to decoder 204.

Decoder 204 then decompresses input data 212. It is common for television service providers to compress the data sent to the users. This data must be decompressed before further processing can begin. An example compressed data file format is MPEG4. Decompressed data 214 is then sent to compositor 206. Compositor 206 also receives information from graphics device 208.

When necessary, graphics device 208 creates the graphics that will be displayed on the television. The graphics than can be displayed include at least one of the group including the channel guide, video information and subtitles. The graphics that will be displayed can be chosen, for example, by the user using remote control unit 106, or software (not shown) in set-top box 102. Once the appropriate graphics have been generated, display graphics 216 is set to compositor 206.

Compositor 206 will combine decoded data 214 and display graphics 216 into one signal. Compositor 206 also determines how the channel video and graphics will be displayed on the screen. For example, when the user sends a command to display information on the program being displayed, compositor 206 will overlay display graphics 216 on decoded data 214, creating composite data 218, which is then sent to output portion 210.

In the event graphics are not to be displayed, compositor 206 does not combine graphics with decoded date 214. In this case, composite data 218 only includes decoded data 214.

Output portion 210 converts composite data 218 into a data format compatible with video unit 104, creating output signal 110. A common format type for high definition televisions is HDMI. Output signal 110 includes the same audio data and video data received by receiver portion 202. An HDMI interface (not shown) returns the television's capabilities, which can be used for selecting the preferred video format.

Referring to FIG. 1, video unit 104 will now display the video and play the audio from the channel selected by the user. For the purposes of explanation, assume the video format of the current channel does not match the video format of the previous channel. In this case, video unit 104 would need to change video formats to match the video format of the video data. This would cause video unit 104 to re-synchronize with the video data, resulting in an ugly transition in the video.

If the transition is from a channel displaying 3D content to a channel displaying 2D content, the user can watch the 2D content while wearing 3D glasses. The glasses are awkward to wear, so people generally take their glasses off when they are not needed. If the transition is from a channel displaying 2D content to a channel displaying 3D content, the user will need to find and wear the 3D viewing glasses. If the transition is from a channel displaying 3D content in one video format to a channel displaying 3D content in another video format, there will be an ugly transition between the channel videos. What is needed is a method of switching between channels of different video formats without causing an action by the user or interrupted video clarity.

In view of the foregoing, there is a need for improved techniques for providing switching between channels of different video formats without causing an action by the user or interrupted video clarity.

BRIEF SUMMARY

In accordance with example embodiments of the present invention, a system and method is provided for switching between channels of different video formats without causing an action by the user or interrupted video clarity.

A system is provided for use with a video input signal and a video unit. The video input signal can be one of a two dimensional video signal and a three dimensional video signal. The video unit can display a three dimensional video and a two dimensional video. The system includes a receiver portion, a processing portion, a switching portion and an output portion. The receiver portion can receive the video input signal. The processing portion can output a first signal in a first mode of operation and can output a second signal in a second mode of operation, wherein the first signal is based on the video input signal and the second signal is based on the video input signal. The switching portion can switch the processing portion from the first mode of operation to the second mode of operation. The output portion can provide an output signal to the video unit, wherein the output signal is based on the first signal when the processing portion operates in the first mode of operation and wherein the output signal is based on the second signal when the processing portion operates in the second mode of operation. The first signal includes a two dimensional video signal, whereas the second signal includes a three dimensional video signal.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

In accordance with aspects of the present invention, a set-top box in a television viewing system will have two modes of operation, a 2D mode and a 3D mode. In the 2D mode, all content may be presented as 2D, wherein 3D content may be converted to 2D. In an example embodiment, 3D content may be converted to 2D by eliminating a stereoscopic perspective. In the 3D mode, all content may be presented as 3D, wherein graphics, e.g. user interface content, etc., will seem to float above the video and may be rendered for each individual eye's perspective. Further, in the 3D mode, 2D content may be presented as flat, or may be converted to 3D.

An example television viewing system in accordance with an aspect of the present invention will now be described with reference to FIGS. 3-6.

An example television viewing system in accordance with an aspect of the present invention will now be described with reference to FIG. 3.

Figure 3:
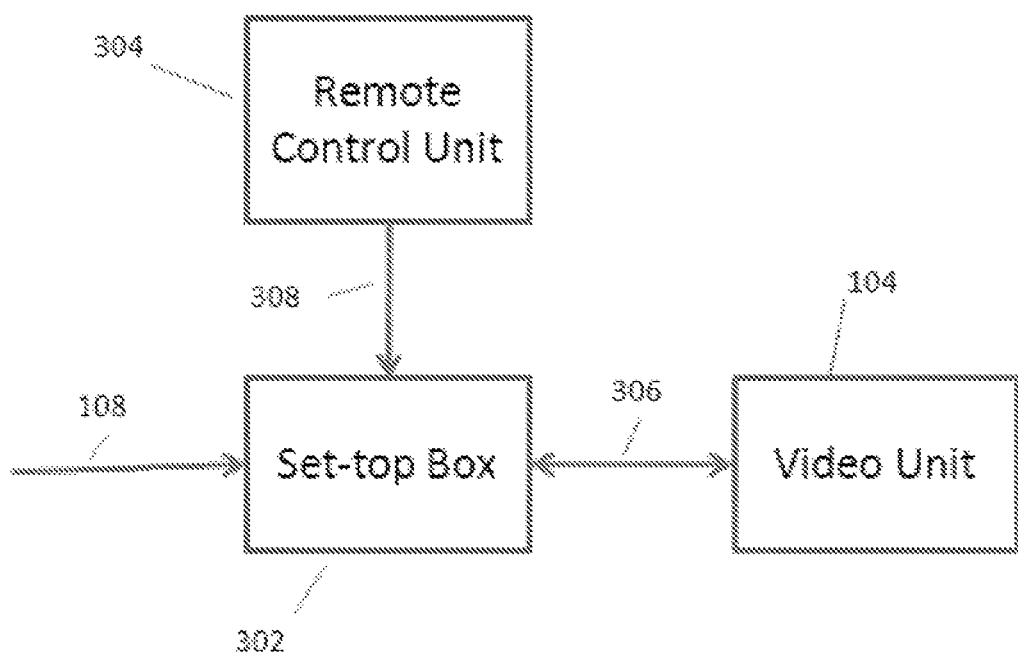
FIG. 3 illustrates an example dual-mode television viewing system in accordance with aspects of the present invention.

FIG. 3 illustrates an example dual-mode television viewing system 300 in accordance with aspects of the present invention.

As illustrated in FIG. 3, dual-mode television viewing system 300 includes of a set-top box 302, a remote control unit 304 and video unit 104.

Set-top box 302 is arranged to receive an input signal 108 from a television service provider (not shown), to receive a remote control signal 308 and to output an output signal 306. Video unit 104 is arranged to receive output signal 306. Remote control unit 304 is arranged to output remote control signal 308.

Remote control unit 304 is operable to send commands from the user to set-top box 302. Non-limiting examples of commands include those for changing the channel, displaying content information and displaying the channel guide. Set-top box 302 is operable to process television content from input signal 108 into an appropriate signal for video unit 104. Video unit 104 is operable to display video and to play audio content processed by set-top box 302.

In operation, the user would utilize remote control unit 304 to send commands to set-top box 302. For the purposes of explanation, assume that a command or series of commands are used to select a channel. Remote control unit 304 would send the command or commands through remote control signal 308.

Once set-top box 302 has received remote control signal 308, set-top box 302 will then process input signal 108 and create output signal 306. A more detailed description of the operation of set-top box 302 will now be described with reference to FIG. 4.

Figure 4:
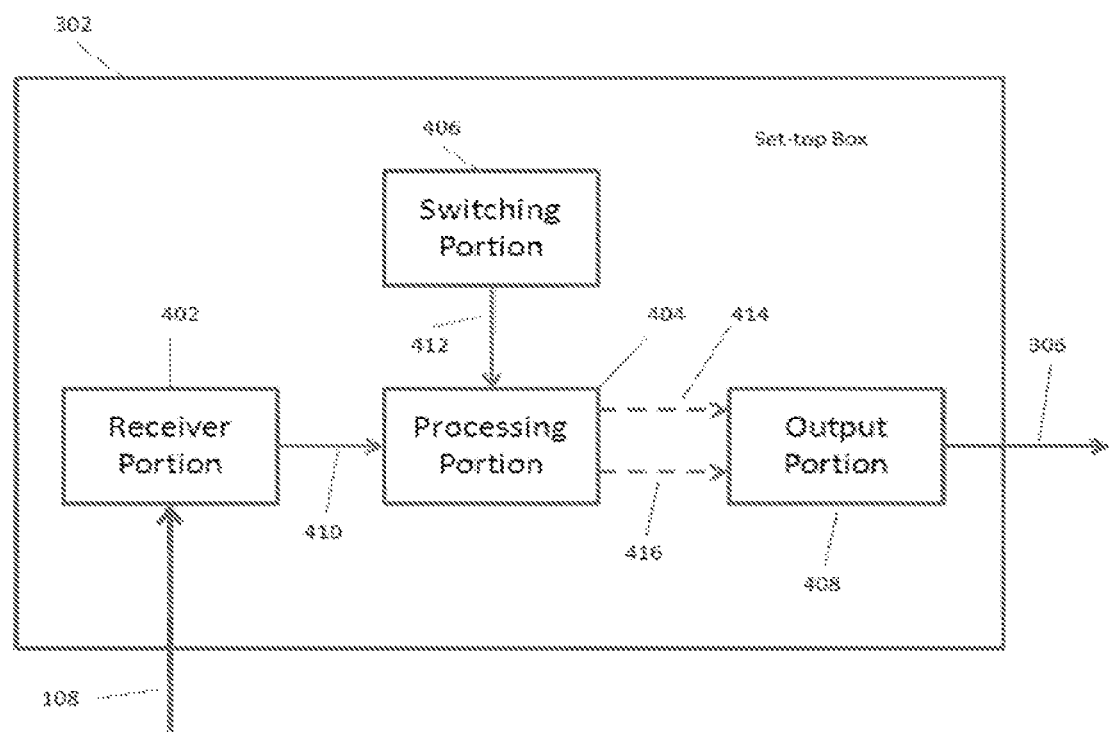
FIG. 4 illustrates an example block diagram of the set-top box of FIG. 3.

FIG. 4 illustrates an example block diagram of set-top box 302 of FIG. 3.

As illustrated in FIG. 4, set-top box 302 comprises of a receiver portion 402, a processing portion 404, a switching portion 406 and an output portion 408. In this example, each of receiver portion 402, processing portion 404, switching portion 406 and output portion 408 are distinct devices. However, in other embodiments, at least two of receiver portion 402, processing portion 404, switching portion 406 and output portion 408 may be combined as a unitary device. Further, in some embodiments at least one of receiver portion 402, processing portion 404, switching portion 406 and output portion 408 may be implemented as tangible computer-readable media for carrying or having computer-executable instructions or data structures stored thereon.

Receiver portion 402 is arranged to receive input signal 108 and to output input data 410. Processing portion 404 is arranged to receive input data 410, to receive a switching signal 412, to output a 2D signal 414 and to output a 3D signal 416. Switching portion 406 is arranged to output switching signal 412. Output portion 408 is arranged to receive 2D signal 414, to receive 3D signal 416 and to output signal 306.

Receiver portion 402 is operable to perform many functions. In this example, receiver portion 402 performs the function of a tuner. In another example, receiver portion 402 may also perform the function of a decrypter. A decrypter is needed if input signal 108 is encrypted.

Processing portion 404 is operable to process the output of receiver portion 402.

Switching portion 406 allows the user to select the output mode of set-top box 302. A method for operating switching portion 406 may include engaging a physical switch on set-top box 302. Of course in some embodiments, set-top box 302 may provide a 2D and a 3D signal concurrently, wherein a TV may determine which signal to use for display.

Output portion 408 is operable to interface the content to be displayed with video unit 104. A non-limiting example of a television interface is HDMI.

In operation, input signal 108 is received by receiver portion 402. Input signal 108 includes data for a multitude of channels provided by the television service provider. Data for each channel includes audio data, video data and meta-data. As discussed previously, receiver portion 402 may perform multiple functions, but must at least perform the function of a tuner. In this example, assume receiver portion 402 only acts as a tuner. In this case, receiver portion 402 filters out all data except for the data for the channel selected by the user. This is input data 410 and includes, but is not limited to, audio data, video data, and meta-data. Input data 410 is then transmitted to processing portion 404. Processing portion 404 also receives a signal from switching portion 406.

Switching portion 406 allows the user to select the output video format. For example, switching portion 406 can be a physical switch on set-top box 302, a remotely controllable switch (controllable by remote control unit 304), software (not shown) within set-top box 302, or a combination thereof. Once the output format has been selected, switching signal 412 is sent to processing portion 404.

Processing portion 404 processes and converts the video data portion of input data 410 into the proper video format. In other words, the output video format of processing portion 404 is determined by switching signal 412, not by the video format of input data 410. For instance, assume the video format of input data 410 is 3D left/right with full resolution, and assume that the user has selected a 2D format with switching portion 406, which is relayed to processing portion 404 by switching signal 412. In this example, processing portion 404 would convert the 3D video into 2D video, and output 2D signal 414.

In another example, assume the video format of input data 410 is 3D top/bottom with full resolution and the user has selected a 3D format with left/right orientation. Processing portion 404 would convert the video format of input signal 410 into the 3D format selected by the user and would output 3D signal 416.

A case also exists where the video format of input signal 410 would be the same as the user selected video format. In this case, the video data in input signal 410 would pass through processing portion 404 without conversion.

In any case, processing portion 404 will either output 2d signal 414 or 3D signal 416 for further processing by output portion 408.

Output portion 408 will convert 2D signal 414 or 3D signal 416 into a signal that is compatible with video unit 104. A common format type for HD television interface is HDMI. This converted signal is output signal 306. Output signal 306 includes video data and audio data for the channel selected by the user.

Figure 1:
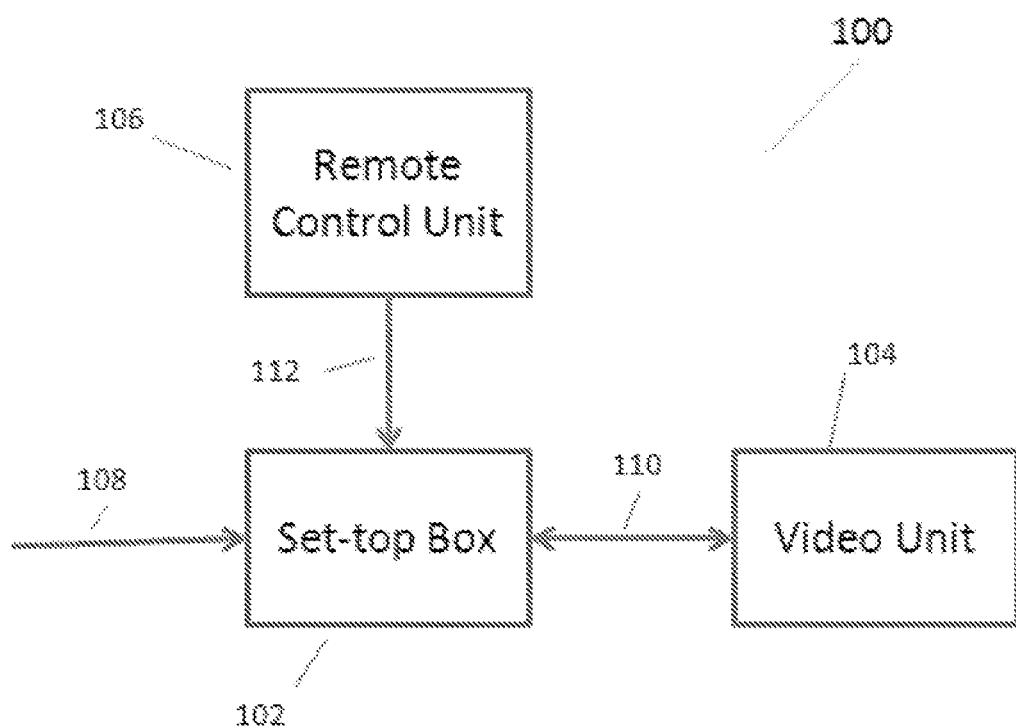
FIG. 1 illustrates a conventional television viewing system.
Figure 2:
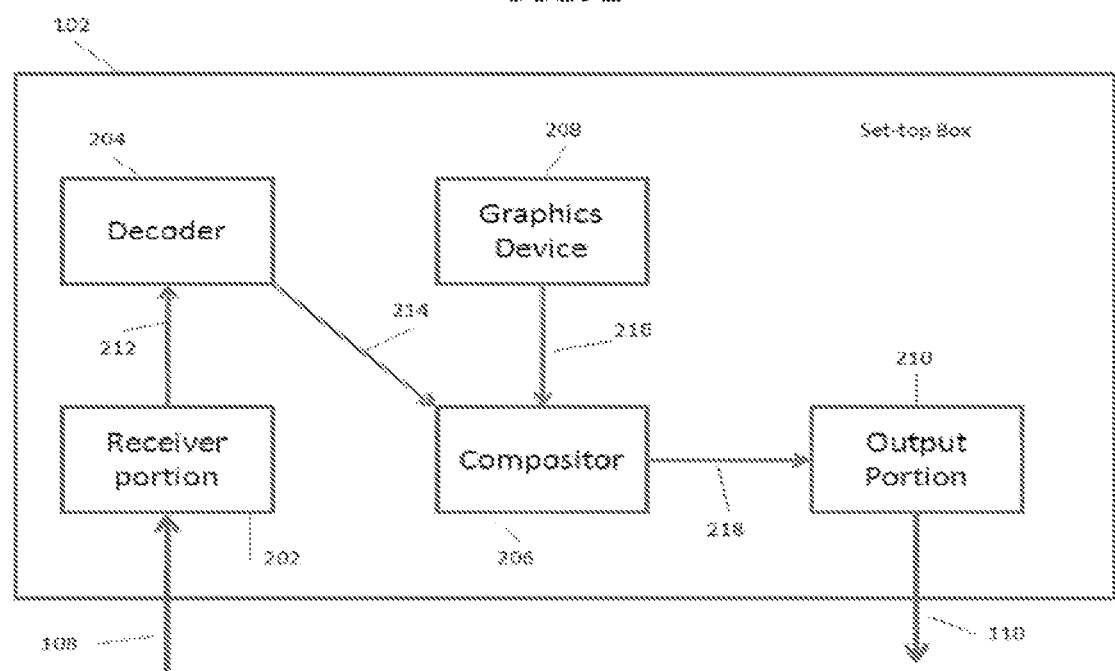
FIG. 2 illustrates an example block diagram of set-top box of FIG. 1.

Returning to FIG. 3, video unit 104 will receive output signal 306 and play the audio and video data from output signal 306. For the purposes of explanation, assume the video format of the current channel does not match the video format of the previous channel. In the previous example in FIG. 1, video unit 104 would need to change video formats to match the video format of the video data. This would cause video unit 104 to re-synchronize with the video data, resulting in an ugly transition between channel video. In the example of FIG. 3, the video format of output signal 306 has been matched to the video format of video unit 104 by set-top box 302.

If the transition is from 3D content to 2D content, the user can watch the 2D content while wearing 3D glasses. However, in accordance with aspects of the present invention, there is a continuity of style and look of the user interface. If the transition is from 2D content to 3D content, the user will not need to find and wear the 3D viewing glasses. If the transition is from 3D content in one video format to 3D content in another video format, there will be a smooth transition between the channel videos. The operation of dual-mode television viewing system 300 will now be further explained with reference to FIG. 5.

Figure 5:
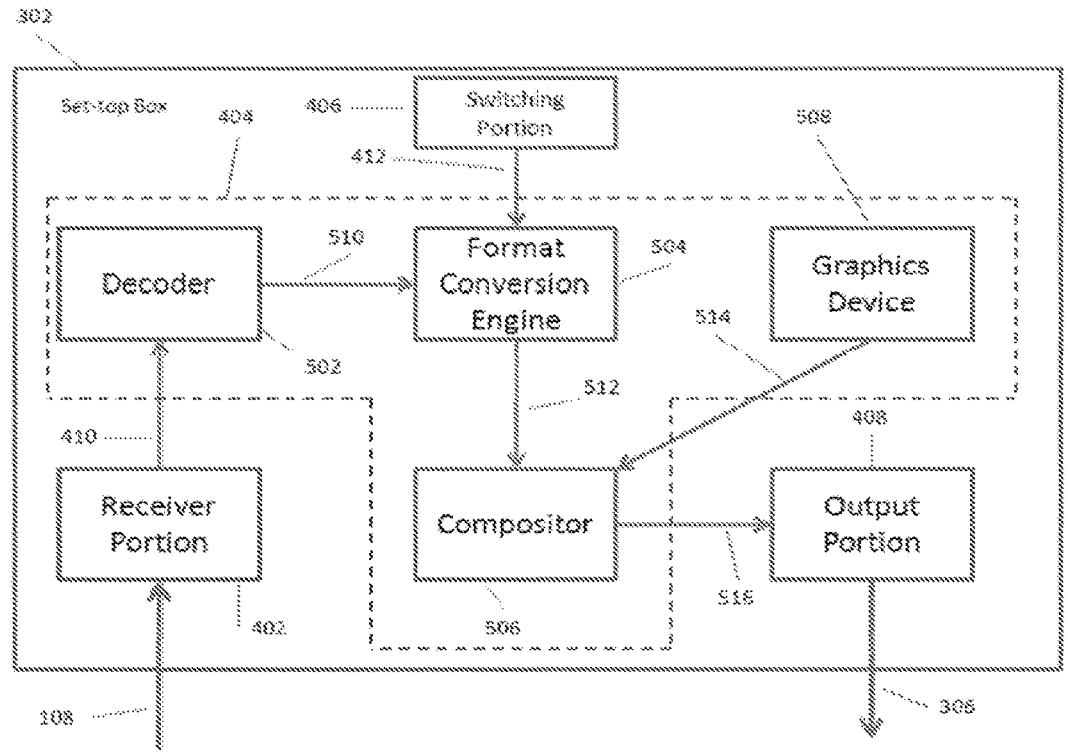
FIG. 5 illustrates another example block diagram of the set-top box of FIG. 3.

FIG. 5 illustrates an example method of operating a television viewing system in accordance with an aspect of the present invention.

FIG. 5 shows an example processing portion 404 in accordance with aspects of the present invention. In this example, processing portion 404 includes a decoder 502, a format conversion engine 504, a compositor 506 and a graphics device 508. In this example, each of decoder 502, format conversion engine 504, compositor 506 and graphics device 508 are distinct devices. However, in other embodiments, at least two of decoder 502, format conversion engine 504, compositor 506 and graphics device 508 may be combined as a unitary device. Further, in some embodiments at least one of decoder 502, format conversion engine 504, compositor 506 and graphics device 508 may be implemented as tangible computer-readable media for carrying or having computer-executable instructions or data structures stored thereon.

As previously explained with reference to FIG. 4, input signal 108 is received by receiver portion 402. As discussed previously, receiver portion 402 may perform multiple functions, non-limiting examples of which include tuning. In this example, assume receiver portion 402 only acts as a tuner. In this case, receiver portion 402 filters out all data except for the data for the channel selected by the user, i.e., input data 410, non-limiting examples of which include audio data, video data, and meta-data. Input data 410 is then transmitted to decoder 502.

Decoder 502 then decompresses input data 410. It is common for television service providers to compress the data sent to the users. This data must be decompressed before further processing can begin. An example compressed data file format is MPEG4. Decompressed data 510 is then transmitted to format conversion engine 504. Format conversion engine 504 also receives a signal from switching portion 406.

Switching portion 406 allows the user to select the output video format, which may generally indicate more than a selection between 2D and 3D. For example, the television may suggests it's preferred video formats such as aspect ratio, resolution and supported 3D formats via the HDMI extended display identification data (EDID). The EDID, a data structure provided by video display describing its capabilities to a video source, and perhaps other configurations, may be used in the selection of formats for both the 2D and the 3D modes. In an example embodiment, the user will be aware of two output modes: 2D and 3D. If video unit 104 does not support 3D content, then the 3D output mode will not be available. Once the output format has been selected, switching signal 412 is sent to format conversion engine 504.

Format conversion engine 504 determines if the video format of decompressed data 510 needs to be converted. The input video format is identified by the meta-data, which may be located within decompressed data 510. If the video format of decompressed data 510 matches the video format selected using switching portion 406, then no conversion is necessary. Decompressed data 510 then becomes formatted data 512 and is transmitted to compositor 506.

If the video format of decompressed data 510 does not match the video format selected using switching portion 406, then format conversion engine 504 converts the video data into the format selected using switching portion 406.

Before the conversion of the input video format can take place, format conversion engine 504 may determine the correct output video format. Video unit 104 is capable of displaying one type or many types of video formats. Video unit 104 will provide set-top box 302 with the formats it can display, and the preferred format. Format conversion engine 504 may then select the appropriate video format based on switching signal 412.

There are many different formats for both 2D and 3D video. A 2D video format includes parameters such as resolution and video refresh rate. A 3D video format includes the 2D parameters in addition to the 3D format selection, e.g., side-by-side, top/bottom, etc. Example methods for converting between these video formats will be explained with reference to FIG. 6.

Figure 6:
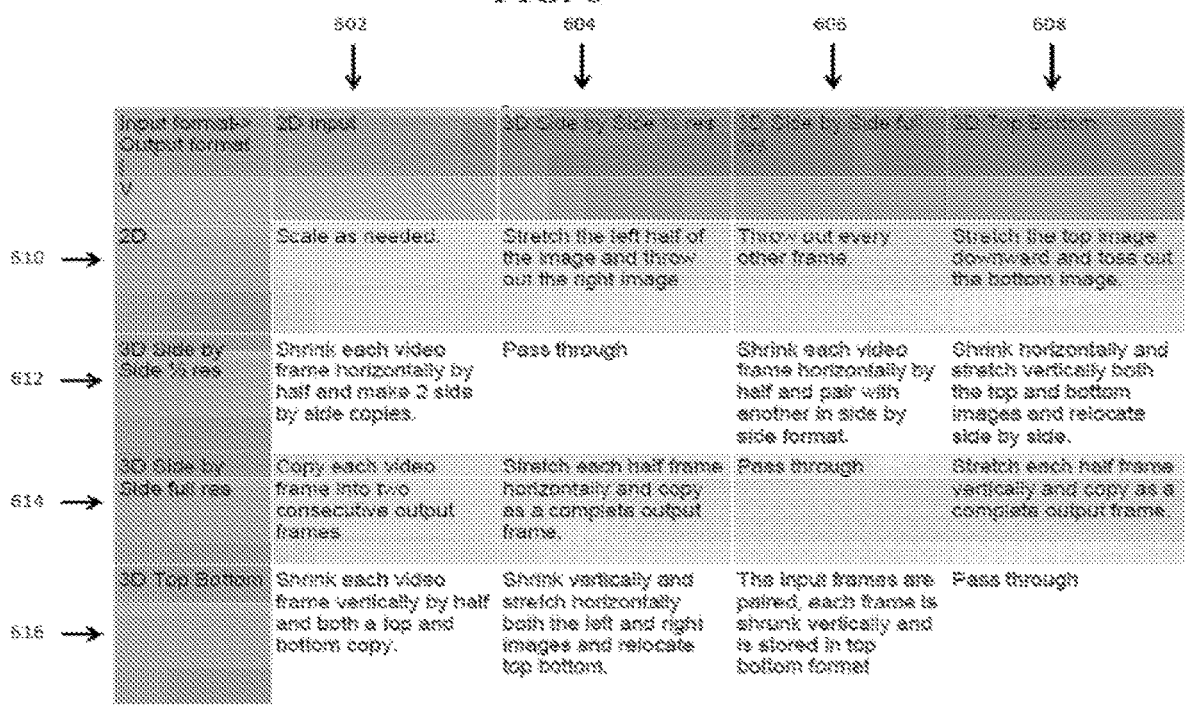
FIG. 6 contains example methods for converting from an input video format to an output video format in accordance with aspects of the present invention.

FIG. 6 contains example methods for converting from an input video format to an output video format in accordance with aspects of the present invention.

FIG. 6 includes a column 602, a column 604, a column 606, a column 608, a row 610, a row 612, a row 614 and a row 616. Column 602, column 604, column 606 and column 608 correspond to possible input video formats. Row 610, row 612, row 614 and row 616 correspond to possible output video formats. The intersection of each row and column shows the actions format conversion engine 504 must take to convert from the input video format to the output video format. In general, in accordance with aspects of the present invention, a set-top box may ask the television for its preferred 2D format parameters and then converts the input video that that format before sending it to the television.

The intersection of column 602 and 610 shows the actions to be performed when the input video format is 2D and the output video format is 2D. In this instance, format conversion engine 504 would scale the video as needed to match the 2D format of video unit 104.

The intersection of column 602 and 612 shows the actions to be performed when the input video format is 2D and the output video format is 3D side-by-side at half resolution. In this instance, format conversion engine 504 would shrink each video frame horizontally by half and make two side-by-side copies to fill a single output frame.

The intersection of column 602 and 614 shows the actions to be performed when the input video format is 2D and the output video format is 3D side-by-side at full resolution. In this instance, format conversion engine 504 would copy each video frame into two consecutive output frames.

The intersection of column 602 and 616 shows the actions to be performed when the input video format is 2D and the output video format is 3D top and bottom. In this instance, format conversion engine 504 would shrink each video frame vertically by half and create both a top and a bottom copy to fill a single output frame.

The intersection of column 604 and 610 shows the actions to be performed when the input video format is 3D side-by-side at half resolution and the output video format is 2D. In this instance, format conversion engine 504 would stretch the left image to match the 2D resolution of video unit 104 and discard the right image. In another embodiment, the left image may be discarded, wherein the right image would be stretched to the left to fill a single output frame.

The intersection of column 604 and 612 shows the actions to be performed when the input video format is 3D side-by-side at half resolution and the output video format is 3D side-by-side at half resolution. In this instance, format conversion engine 504 would perform no action and pass the input video through in altered.

The intersection of column 604 and 614 shows the actions to be performed when the input video format is 3D side-by-side at half resolution and the output video format is 3D side-by-side at full resolution. In this instance, format conversion engine 504 would stretch each half frame perspective horizontally and copy as a complete output frame.

The intersection of column 604 and 616 shows the actions to be performed when the input video format is 3D side-by-side at half resolution and the output video format is 3D top and bottom. In this instance, format conversion engine 504 would shrink vertically and stretch horizontally both the right and left images and relocate to top and bottom orientation.

The intersection of column 606 and 610 shows the actions to be performed when the input video format is 3D side-by-side at full resolution and the output video format is 2D. In this instance, format conversion engine 504 would discard every other frame to keep either the left or right perspective and to eliminate the other.

The intersection of column 606 and 612 shows the actions to be performed when the input video format is 3D side-by-side at full resolution and the output video format is 3D side-by-side at half resolution. In this instance, format conversion engine 504 would collect sequential pairs of frames (containing both a left and right perspective) and pack them into a single output frame by shrinking them horizontally.

The intersection of column 606 and 614 shows the actions to be performed when the input video format is 3D side-by-side at full resolution and the output video format is 3D side-by-side at full resolution. In this instance, format conversion engine 504 would perform no action and pass the input video through in altered.

The intersection of column 606 and 616 shows the actions to be performed when the input video format is 3D side-by-side at full resolution and the output video format is 3D top and bottom. In this instance, format conversion engine 504 would collect sequential pairs of frames (containing both a left and right perspective) and pack them into a single output frame by shrinking them vertically and placing the second under the first.

The intersection of column 608 and 610 shows the actions to be performed when the input video format is 3D top and bottom and the output video format is 2D. In this instance, format conversion engine 504 would stretch the top image to match the 2D resolution of video unit 104 and discard the bottom image.

The intersection of column 608 and 612 shows the actions to be performed when the input video format is 3D top and bottom and the output video format is 3D side-by-side at half resolution. In this instance, format conversion engine 504 would shrink horizontally and stretch vertically both the top and bottom images and relocate to a side-by-side orientation.

The intersection of column 608 and 614 shows the actions to be performed when the input video format is 3D top and bottom and the output video format is 3D side-by-side at full resolution. In this instance, format conversion engine 504 would stretch each half frame vertically and copy as a complete output frame.

The intersection of column 608 and 616 shows the actions to be performed when the input video format is 3D top and bottom and the output video format is 3D top and bottom. In this instance, format conversion engine 504 would perform no action and pass the input video through in altered.

As previously explained, set-top box 302 will identify which 3D video modes are available with video unit 104. Based on which modes are available, format conversion engine 504 will determine the best format for the output video. If full resolution 50 Hz or better is available, that will be selected and used exclusively for 3D mode. In 3D mode, all input formats will be converted to this format, and there should be no loss of quality in that conversion. If either video unit 104 or set-top box 302 does not support full resolution 60 Hz, then half resolution side-by-side or top-bottom will be used.

When entering 3D mode, an output format is selected that is supported by video unit 104, and best matches the format of the current video source. If the input source is 2D, side-by-side will be selected because it is more popular.

While set-top box 302 is in 3D output mode and the 3D format of the input video changes, after a few seconds the 3D output format will change to match. This may cause the video unit 104 to re-synchronize, but the resolution should improve. The goal of the delay is to avoid re-synchronizing while flipping through channels, and to only adjust once the user has settled on a channel. This transition may be performed when the conversion from the 3D format of the new source to the current 3D output format is more lossy than another 3D format supported by the television, e.g., if the television does not support full resolution side-by-side, but is supports both half-resolution side-by-side and top/bottom. Tuning from a side-by-side channel to a top/bottom channel may leave the output format in the side-by-side mode. In such a case, the video quality may be degraded, and should be corrected.

Once the video data has been converted, formatted data 512 is transmitted to compositor 506. Compositor 506 also receives information from graphics device 508.

When necessary, graphics device 508 creates the graphics that will be displayed on the television. Non-limiting examples of graphics that may be displayed include the channel guide, video information or subtitles. The graphics that will be displayed can be chosen, for example, by the user using remote control unit 304, or software (not shown) in set-top box 302. Once the appropriate graphics have been generated, display graphics 514 are provided to compositor 506.

Compositor 506 will combine formatted data 512 and display graphics 514 into one signal. Compositor 506 also determines how the channel video and graphics will be displayed on the screen. For example, when the user sends a command to display information in front of the program being displayed, compositor 506 will overlay display graphics 514 on the video data portion of formatted data 512, creating composite data 516, which is then sent to output portion 408.

In the event graphics are not to be displayed, compositor 506 does not combine graphics with the video data portion of formatted data 512. In this case, composite data 516 only includes formatted data 512.

Output portion 408 will convert composite data 516 into a signal that is compatible with video unit 104. A common format type for HD television interface is HDMI. This converted signal is output signal 306. Output signal 306 includes video data and audio data for the channel selected by the user.

Example methods for using dual-mode television viewing system 300 of FIG. 3 will now be described in detail with reference to FIGS. 7-8.

Figure 7:
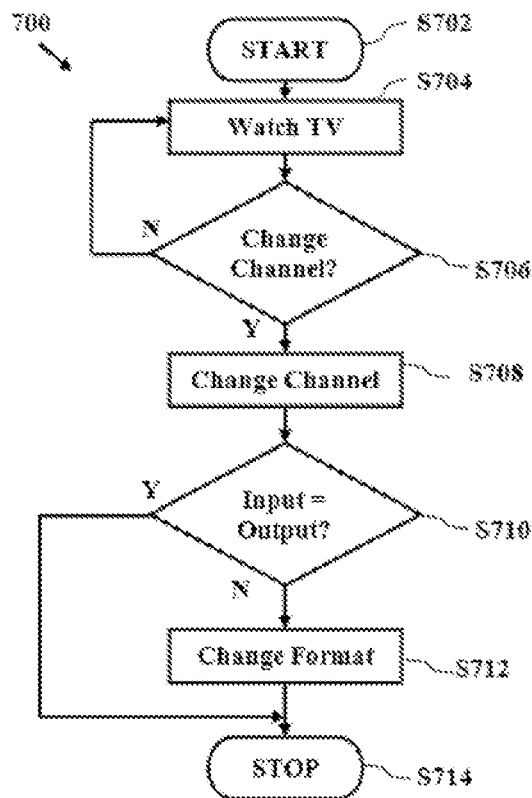
FIG. 7 illustrates an example method of operating the dual-mode television viewing system of FIG. 3.
Figure 8:
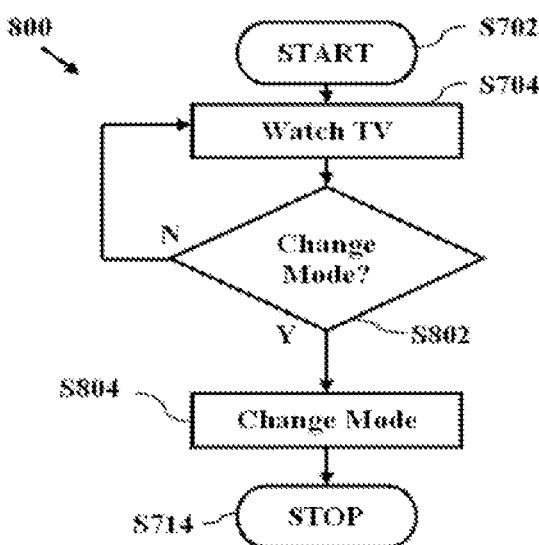
FIG. 8 illustrates another example method of operating the dual-mode television viewing system of FIG. 3.

Method 700 of FIG. 7 is drawn to the situation where a user is watching television and decides to change the channel.

As shown in the figure, method 700 starts (S702) and the user is watching television (S704). For example, referencing FIG. 4, the tuner portion of receiver portion 402 filters out all data except for the data for the channel the user is watching. Non-limiting examples of input data 410 include, audio data, video data, and meta-data. The data is then decoded. For example, as illustrated in FIG. 5, input data 410 is then decompressed by decoder 502, and decompressed data 510 is transmitted to format conversion engine 504.

Input data 410 is of a particular mode, i.e., 2D or 3D, and is of a particular format, e.g., a specific scale, or resolution as discussed above with reference to FIG. 6. For purposes of explanation, presume that at this point the format of the input data matched the format required by the television (if not, then the formats will be matched as discussed with reference to S710 as discussed below).

It is then determined whether the channel is changed (S706). For example, the user selects a new desired channel. As shown in FIG. 3, remote control unit 304 may be used to select the desired channel and commands are sent to set-top box 302 through remote control signal 308.

If the channel is not changed, the user continues to watch television on the current channel (S704).

If the channel is changed, the user selects the desired channel (S708). For example, referencing FIG. 3, remote control unit 304 may be used to select the desired channel and commands are sent to set-top box 302 through remote control signal 308. Referencing FIG. 4, the tuner portion of receiver portion 402 filters out all data except for the data for the channel selected by the user. Non-limiting examples of input data 410 include audio data, video data, and meta-data. As illustrated in FIG. 5, input data 410 is then decompressed by decoder 502, and decompressed data 510 is transmitted to format conversion engine 504.

Returning to FIG. 7, once the channel is changed (S708), it is determined whether the format of the input data is the same as the output format required by the television (S710). For example, as illustrated in FIG. 5, input data 410 is then decompressed by decoder 502, and decompressed data 510 is transmitted to format conversion engine 504. At this point, the channel format is compared to the format supported by the video unit. For example, format conversion engine then compares the video format of decompressed data 510 and the video format selected by switching portion 406.

In another embodiment, rather than determine whether the format of the input data is the same as the output format required by the television as discussed above (S710), it may be determined whether the format of the new input data from the new channel matches the format of the input data from the old channel. If this is the case, the new input data is merely passed through or scaled as needed.

If it is determined that the format of the input data is not the same as the output format required by the television (or it is determined that the input data corresponding to the new channel does not match the input data corresponding to the old channel), then the format of the input data is changed (S712). For example, conversion engine 504 may convert the video data. As previously discussed, methods already exist for converting various video formats on another. For example, converting a 2D video frame into a full resolution side-by-side 3D video frame involves copying the 2D frame into two consecutive output frames. In another example, converting a full resolution side-by-side 3D frame into a 2D frame involves deleting every other frame. No matter the conversion, format conversion engine 504 is capable of each. Once conversion is complete, the process moves to forward and formatted data 512 is transmitted to compositor 506.

At this point, method 700 stops (S714).

In another situation, the user may want to switch modes, e.g., from a current 3D mode to a 2D mode or from a current 2D mode to a 3D mode. This will be described with reference to method 800 of FIG. 8.

As shown in the figure, method 800 starts (S702) and the user is watching television (S704) in a manner similar to that discussed above with reference to FIG. 7.

It is then determined whether the mode is to be changed (S802). For example, the use first decides whether they want to watch in 2D or 3D. If the user wants to watch in 3D and has the 3D glasses, then they may choose 3D.

If the mode is not to be changed, then the user continues to watch television (S704). Alternatively, if the mode is to be changed, the user changes the mode (S804). For example, returning to FIG. 4, the user selects the mode using switching portion 406. As previously explained, switching portion 406 can be a physical switch on set-top box 302, a remotely controllable switch (controllable by remote control unit 304), software (not shown) within set-top box 302, or a combination thereof.

After the mode is changed, the output format is chosen based on the best supported format listed in the EDID. For example, if full-resolution side-by-side is a supported 3D format, then full-resolution side-by-side is the selected 3D output format. Further, if the television does not support full-resolution, a lower resolution format is picked. Still further, if the current tuned channel is 3D, the 3D input format could be selected as the output format.

Additionally, graphics may be added to the input data. For example, returning to FIG. 5, formatted data 512 is first transmitted to compositor 506. Then any graphics, if necessary, may be added to the video data. As previously discussed, when necessary, graphics device 508 creates the graphics that will be displayed on the television. The graphics that will be displayed can be chosen, for example, by the user using remote control unit 304, or software (not shown) in set-top box 302. Once the appropriate graphics have been generated, display graphics 514 is set to compositor 506.

Compositor 506 will combine formatted data 512 and display graphics 514 into one signal. Compositor 506 also determines how the channel video and graphics will be displayed on the screen. For example, when the user sends a command to display information on the program being displayed, compositor 506 will overlay display graphics 514 on the video data portion of formatted data 512, creating composite data 516, which is then sent to output portion 408.

In the event graphics are not to be displayed, compositor 506 does not combine graphics with the video data portion of formatted data 512. In this case, composite data 516 only includes formatted data 512. Output portion 408 will convert composite data 516 into a signal that is compatible with the video unit. A common format type for HD television interface is HDMI. This converted signal is output signal 306. Output signal 306 includes video data and audio data for the channel selected by the user. Then the combined graphics and video data are provided to the video unit. The video and audio content for the desired channel will be presented by video unit 104. At this point, method 800 stops (S714).

In short, when watching television in accordance with aspects of the present invention, a user may perform one of three actions: 1) continue to watch television on the current channel in the current mode; 2) change the channel; or change the mode (from 3D to 2D or from 2D to 3D). If the user merely continues to watch television, then there is no change in the mode or the format. If the user changes the channel, there may be a change in the format of the input data, which is taken into account via method 700 of FIG. 7. If the user changes the mode, then the changes in the output are taken into account via method 800 of FIG. 8. Finally, there may be situations where the format of a channel changes without the intervention of a user, such as when a 3D movie follows a 2D movie on the same channel. In these situations, the changes in the output are taken into account via steps S710 and S712 of method 700 of FIG. 7.

In accordance with aspects of the present invention, a set-top box in a television viewing system will have two modes of operation, a 2D mode and a 3D mode. In the 2D mode, all content may be presented as 2D, wherein 3D content may be converted to 2D. In the 3D mode, all content may be presented as 3D. Further, in the 3D mode, 2D content may be presented as flat, or may be converted to 3D.

Aspects of the present invention provide advantages over conventional 3D/2D video imaging system, as will now be described.

One advantage deals with transitioning between modes. In particular, when tuning, each transition between TV channels with different 2D and 3D formats will cause the video unit, e.g., television, to resynchronize. Each video unit will handle this event differently, but it will always be an unpleasant transition. In accordance with aspects of the present invention, resynchronization only occurs when the modes of operation are changed. At the same time, a user may want to put on or remove 3D glasses (when using or not using, as the case may be), so the resynchronization occurs at a more acceptable time.

Another advantage deals with the user interface geometry. While tuned to 3D channels, the user interface graphics are rendered above the video. Also, while tuned to 2D channels, the user interface graphics are rendered on the same plane as the video. Currently, as you tune and transition between 2D and 3D channels, the graphics of the User Interface hops into and out of the video plain. In accordance with aspects of the present invention, the graphics geometry stays in a persistent mode, selected by the user.

Another advantage deals with presenting 2D EAS (Emergency Alert System) during a 3D program. Typically, EAS content is presented in 2D. Currently, if you are watching a 3D channel, the TV will be switched to 2D when EAS content is displayed, causing a re-synchronization and a momentary loss of audio/video. In accordance with aspects of the present invention, the EAS can be in any format and it will be converted to the current mode's format, selected by the user, avoiding the loss of audio/video content.

Another advantage deals with the insertion of advertisements. In particular, the existing design requires that inserted advertisements match the preceding content or a re-synchronization and graphics transition will occur both at the beginning of the inserted clip and after returning back to the initial program. In accordance with aspects of the present invention, inserted advertisements will be converted to match the format of the current output mode. A single advertisement clip can be inserted into any program, regardless of 3D format.

Another advantage deals with making mpeg stills cheaper and easier to use. In particular, with the existing design, mpeg stills to be displayed must match the preceding content or a re-synchronization and graphics transition will occur both at the beginning of the inserted clip and after returning back to the initial program. In accordance with aspects of the present invention, mpeg stills can be in any format and will be converted to match the current mode's format. This makes the distribution and storage of mpeg stills simpler and cheaper.

Another advantage deals with alleviating issues caused by tuner swapping and DVR (Digital Video Recorder) operations. In particular, tuner swapping and DVR operations can cause 2D/3D format transition. For example, this can occur when swapping between 2D and 3D channels, switching between a live channel and recorded content and playback and rewind of recorded content that crosses 2D/3D transitions. Currently, each transition will re-synchronize the TV, and cause the graphics geometry to change. In accordance with aspects of the present invention, the source content will be converted to match the current output 3D format.

Another advantage allows users to watch content presented in 3D even if 3D glasses are unavailable. Currently, if a user wishes to watch content that is only presented in a 3D format, the user must have 3D glasses. If 3D glasses are unavailable, the user will not be able to watch that content clearly. In accordance with aspects of the present invention, the user would select the 2D output mode on the set-top box and the 3D content would be presented in a 2D format.

Another advantage deals with duplicating channels for 2D and 3D. Currently service providers must duplicate channels, one being in 2D format and on being in a 3D format. This expands the number of channels the user has available to choose from and requires more bandwidth. In accordance with aspects of the present invention, the service provider would only need to provide on format for each channel and the set-top box would convert the content to the format the user selects. This would save bandwidth and make the channel lineup more compact and simple.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for controlling presentation of content, the method comprising:
   causing a first piece of content to be presented in a first format on a display;
   determining that the display is to switch to presenting a second piece of content that is in the first format;
   causing the second piece of content to be presented in the first format on the display;
   while causing the second piece of content to be presented in the first format, receiving a user input from a device associated with the display that indicates that a presentation mode specified by the display is to be switched to a mode corresponding to a second format;
   in response to receiving the user input that indicates that the presentation mode specified by the display is to be switched to the mode corresponding to the second format, converting the second piece of content in the first format to a corresponding second piece of content in the second format; and
   causing the second piece of content to be presented in the second format on the display.

2. The method of claim 1, wherein the determination that the display is to switch to presenting the second piece of content corresponds to a channel change from a first channel associated with the first piece of content to a second channel associated with the second piece of content.

3. The method of claim 1, wherein the first format is a 2D video content format, and wherein the second format is a 3D video content format.

4. The method of claim 3, wherein converting the second piece of content in the first format to the corresponding second piece of content in the second format comprises copying each 2D video content frame into two consecutive output frames.

5. The method of claim 1, wherein the first format is a 3D video content format, and wherein the second format is a 2D video content format.

6. The method of claim 5, wherein converting the second piece of content in the first format to the corresponding second piece of content in the second format comprises deleting every other frame of the 3D video content.

7. A system for controlling presentation of content, the system comprising:
   a memory; and
   a hardware processor that, when executing computer executable instructions stored in the memory, is configured to:
   cause a first piece of content to be presented in a first format on a display;
   determine that the display is to switch to presenting a second piece of content that is in the first format;
   cause the second piece of content to be presented in the first format on the display;
   while causing the second piece of content to be presented in the first format, receive a user input from a device associated with the display that indicates that a presentation mode specified by the display is to be switched to a mode corresponding to a second format;
   in response to receiving the user input that indicates that the presentation mode specified by the display is to be switched to the mode corresponding to the second format, convert the second piece of content in the first format to a corresponding second piece of content in the second format; and
   cause the second piece of content to be presented in the second format on the display.

8. The system of claim 7, wherein the determination that the display is to switch to presenting the second piece of content corresponds to a channel change from a first channel associated with the first piece of content to a second channel associated with the second piece of content.

9. The system of claim 7, wherein the first format is a 2D video content format, and wherein the second format is a 3D video content format.

10. The system of claim 9, wherein converting the second piece of content in the first format to the corresponding second piece of content in the second format comprises copying each 2D video content frame into two consecutive output frames.

11. The system of claim 7, wherein the first format is a 3D video content format, and wherein the second format is a 2D video content format.

12. The system of claim 11, wherein converting the second piece of content in the first format to the corresponding second piece of content in the second format comprises deleting every other frame of the 3D video content.

13. A non-transitory computer-readable medium containing computer executable instructions that, when executed by a processor, cause the processor to perform a method for controlling presentation of content, the method comprising:
   causing a first piece of content to be presented in a first format on a display;
   determining that the display is to switch to presenting a second piece of content that is in the first format;
   causing the second piece of content to be presented in the first format on the display;
   while causing the second piece of content to be presented in the first format, receiving a user input from a device associated with the display that indicates that a presentation mode specified by the display is to be switched to a mode corresponding to a second format;
   in response to receiving the user input that indicates that the presentation mode specified by the display is to be switched to the mode corresponding to the second format, converting the second piece of content in the first format to a corresponding second piece of content in the second format; and
   causing the second piece of content to be presented in the second format on the display.

14. The non-transitory computer-readable medium of claim 13, wherein the determination that the display is to switch to presenting the second piece of content corresponds to a channel change from a first channel associated with the first piece of content to a second channel associated with the second piece of content.

15. The non-transitory computer-readable medium of claim 13, wherein the first format is a 2D video content format, and wherein the second format is a 3D video content format.

16. The non-transitory computer-readable medium of claim 15, wherein converting the second piece of content in the first format to the corresponding second piece of content in the second format comprises copying each 2D video content frame into two consecutive output frames.

17. The non-transitory computer-readable medium of claim 13, wherein the first format is a 3D video content format, and wherein the second format is a 2D video content format.

18. The non-transitory computer-readable medium of claim 17, wherein converting the second piece of content in the first format to the corresponding second piece of content in the second format comprises deleting every other frame of the 3D video content.

* * * * *